(12) United States Patent
Haubrich et al.

(10) Patent No.: US 8,790,459 B2
(45) Date of Patent: Jul. 29, 2014

(54) COLORED REFLECTIVE FEATURES AND INKS AND PROCESSES FOR MAKING THEM

(75) Inventors: Scott T. Haubrich, Albuquerque, NM (US); Mark J. Hampden-Smith, Albuquerque, NM (US); Rimple Bhatia, Albuquerque, NM (US); Miodrag Oljaca, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 1020 days.

(21) Appl. No.: 11/443,304

(22) Filed: May 31, 2006

(65) Prior Publication Data

US 2007/0281140 A1 Dec. 6, 2007

(51) Int. Cl.
| | |
|---|---|
| C09D 11/00 | (2014.01) |
| B32B 3/00 | (2006.01) |
| B32B 5/16 | (2006.01) |
| B32B 7/00 | (2006.01) |
| C09D 11/10 | (2014.01) |
| B42D 15/00 | (2006.01) |
| B44F 1/10 | (2006.01) |

(52) U.S. Cl.
CPC .............. *C09D 11/322* (2013.01); *C09D 11/50* (2013.01); *C09D 11/101* (2013.01); *B42D 2035/24* (2013.01); *B42D 15/0013* (2013.01); *B44F 1/10* (2013.01)
USPC ............. 106/31.65; 106/31.27; 106/31.6; 428/206

(58) Field of Classification Search
USPC ......... 252/301.36; 106/403, 404, 31.6, 31.27, 106/31.65; 428/206
See application file for complete search history.

(56) References Cited

U.S. PATENT DOCUMENTS

| | | | |
|---|---|---|---|
| 4,343,879 A * | 8/1982 | Drexler et al. ................. 430/14 |
| 4,434,010 A | 2/1984 | Ash | |
| 4,504,084 A | 3/1985 | Jauch | |
| 4,539,041 A | 9/1985 | Figlarz et al. | |
| 4,705,356 A | 11/1987 | Berning et al. | |
| 4,779,898 A | 10/1988 | Berning et al. | |
| 5,059,245 A | 10/1991 | Phillips et al. | |
| 5,278,590 A | 1/1994 | Phillips et al. | |
| 5,304,587 A | 4/1994 | Oswald et al. | |
| 5,324,567 A | 6/1994 | Bratchley et al. | |

(Continued)

FOREIGN PATENT DOCUMENTS

| | | |
|---|---|---|
| DE | 102 48 870 A1 | 4/2004 |
| EP | 0 984 043 A1 | 3/2000 |

(Continued)

OTHER PUBLICATIONS

Invitation to Pay Additional Fees and Communication Relating to the Results of the Partial International Search for International Application PCT/US2007/070160, mailed Jun. 5, 2008 (5 pages).

(Continued)

*Primary Examiner* — Shuangyi Abu Ali (57) ABSTRACT

The present invention relates to colored reflective features, e.g., reflective security features or reflective decorative features, that optionally exhibit color shifting and to inks and processes for making such features. The features, as well as the inks optionally used to form the features, comprise nanoparticles and a colorant that preferably modifies a spectrum of light that is reflected by a reflective layer formed from the nanoparticles. The processes involve forming the features from one or more inks using a direct write printing process.

13 Claims, 4 Drawing Sheets

(56) References Cited

U.S. PATENT DOCUMENTS

| | | |
|---|---|---|
| 5,498,283 A | 3/1996 | Botros et al. |
| 5,569,535 A | 10/1996 | Phillips et al. |
| 5,648,165 A | 7/1997 | Phillips et al. |
| 5,718,754 A | 2/1998 | Macpherson et al. |
| 5,720,801 A | 2/1998 | Nadan et al. |
| 5,766,738 A | 6/1998 | Phillips et al. |
| 5,853,464 A | 12/1998 | Macpherson et al. |
| 5,889,083 A | 3/1999 | Zhu |
| 5,944,881 A | 8/1999 | Mehta et al. |
| 5,980,593 A | 11/1999 | Friswell et al. |
| 6,013,307 A | 1/2000 | Hauser et al. |
| 6,114,018 A | 9/2000 | Phillips et al. |
| 6,565,770 B1 * | 5/2003 | Mayer et al. ............. 252/301.36 |
| 6,712,894 B2 | 3/2004 | Shepard |
| 6,903,850 B2 | 6/2005 | Kay et al. |
| 6,905,755 B1 | 6/2005 | Nemeth |
| 6,937,752 B2 | 8/2005 | Chiba et al. |
| 6,938,013 B1 | 8/2005 | Gutierrez-Sheris |
| 6,972,138 B2 | 12/2005 | Heinrich et al. |
| 6,979,499 B2 | 12/2005 | Walck et al. |
| 2004/0182533 A1 | 9/2004 | Blum et al. |
| 2005/0064157 A1 | 3/2005 | Okazawa et al. |
| 2005/0078158 A1 | 4/2005 | Magdassi et al. |
| 2005/0170259 A1 | 8/2005 | Holmes |
| 2005/0192888 A1 | 9/2005 | Lennane et al. |
| 2005/0258637 A1 | 11/2005 | Bi et al. |
| 2005/0271566 A1 | 12/2005 | Yadav |
| 2005/0284366 A1 | 12/2005 | Anderson et al. |
| 2006/0083694 A1 | 4/2006 | Kodas et al. |
| 2006/0159603 A1 | 7/2006 | Vanheusden et al. |
| 2006/0159838 A1 | 7/2006 | Kowalski et al. |
| 2006/0160373 A1 | 7/2006 | Kowalski et al. |
| 2006/0162497 A1 | 7/2006 | Kodas et al. |
| 2006/0166057 A1 | 7/2006 | Kodas |
| 2006/0189113 A1 | 8/2006 | Vanheusden et al. |
| 2007/0076069 A1 | 4/2007 | Edwards et al. |

FOREIGN PATENT DOCUMENTS

| | | |
|---|---|---|
| EP | 1132450 A2 | 9/2001 |
| EP | 1 304 363 A2 | 4/2003 |
| EP | 1335217 A2 | 8/2003 |
| EP | 1 304 363 A3 | 12/2003 |
| EP | 1407824 A1 | 4/2004 |
| EP | 1299250 B1 | 4/2005 |
| EP | 1609441 A1 | 12/2005 |
| WO | WO 90/08046 | 7/1990 |
| WO | 00/18591 A | 4/2000 |
| WO | WO 00/24580 | 5/2000 |
| WO | 02/053677 A1 | 7/2002 |
| WO | WO 2005/070693 A1 | 8/2005 |
| WO | WO 2005/080089 A1 | 9/2005 |
| WO | WO 2005/123272 A2 | 12/2005 |
| WO | WO 2006/052500 A2 | 5/2006 |

OTHER PUBLICATIONS

U.S. Appl. No. 11/331,230.
U.S. Appl. No. 11/331,233.
U.S. Appl. No. 11/588,030.
C&EN: Cover Story—Rainbow in a Can, CENEAR vol. 81, No. 44, pp. 25-27 (Nov. 3, 2003) (ISSN 0009-2347).
Smith, H., High Performance Pigments, Wiley-VCH Verlag-GmbH, Weinheim, Germany (2002).
Silvert, P.-Y. et al., "Preparation of colloidal silver dispersions by the polyol process" Part 1—Synthesis and characterization, *J. Mater. Chem.*, (1996), 6(4). pp. 573-577, and Part 2—Mechanism of particle formation, *J. Mater Chem.*, (1997), 7(2), pp. 293-299.
Pond, S., "Inkjet Technology and Product Development Strategies," *Torrey Pines Research* (2000), pp. 115-122.
van Renesse, R., *Optical Document Security*, 3$^{rd}$ Edition, ARTECH House (ISBN 1-58053-6), Sections 4.2.6, 6.12, 7.1.3.
http://news.thomasnet.com/fullstory/474510/rss/1303.
Ryan, M., "Introduction to IR-Reflective Pigments," Aug. 1, 2005, http://www.pcimag.com/CDA/Archives/cf5b599d3f6a7010VgnVCM100000f932a8c0.

* cited by examiner

COLORED REFLECTIVE FEATURES AND INKS AND PROCESSES FOR MAKING THEM

FIELD OF THE INVENTION

The present invention relates to reflective features and to processes for making reflective features. In particular, the invention relates to colored reflective features, e.g., reflective security feature or reflective decorative features, that exhibit color constancy or color shifting effects.

BACKGROUND OF THE INVENTION

Recent advances in color copying and printing have put increasing importance on developing new methods to prevent forgery of security documents such as banknotes. While there have been many techniques developed, one area of increasing interest is in developing security features that cannot be readily reproduced, particularly by a color copier or printer.

One approach that has been taken is to formulate an ink for creating a printed image that is visually distinct from its reproduction. For example, U.S. Pat. Nos. 5,059,245, 5,569, 535, and 4,434,010, the entireties of which are incorporated herein by reference, describe the use of stacked thin film platelets or flakes. Images produced with these pigments exhibit a change in color as the viewing angle changes. These pigments have been incorporated into security inks used, for example, in paper currency. These pigments have also been incorporated into plastics applications (see, for example, PCT Publication WO 00/24580, published May 4, 2000). Additional inks and security features are described in U.S. Pat. Nos. 4,705,356; 4,779,898; 5,278,590; 5,766,738; and 6,114, 018, the entireties of which are incorporated herein by reference.

Direct write printing processes such as ink jet printing are highly desirable for various security applications because they provide the ability to print variable features and/or information, such as serial numbers. Inks containing platelets and flakes, however, are generally undesirable for certain printing processes, such as ink jet printing processes, because the flow characteristics of inks containing platelets and flakes are generally unsuitable for such deposition techniques. Accordingly, the need exists for inks suitable for direct write printing processes, such as ink jet printing processes, to form images that exhibit color shifting. The need also remains to provide additional processes, e.g., ink jet printing processes, for producing images, particularly for security documents, which cannot be easily reproduced, and which are visually distinct from their reproductions.

Additionally, the need exists for providing the ability to create features, e.g., security features, that display variable information, e.g., information that is individualized for a specific product unit, such as a serial number, which variable information cannot be easily or readily duplicated or copied. The need also exists for providing the ability to create reflective features displaying variable information and having high resolution at commercially acceptable rates.

SUMMARY OF THE INVENTION

In one embodiment, the invention is to a reflective feature, e.g., a reflective security feature or a reflective decorative feature, comprising: (a) a reflective layer comprising nanoparticles; and (b) a colorant, e.g., a dye or pigment.

The feature may be disposed on a substantially porous substrate. In this embodiment, the colorant may form a halo around an image formed from the nanoparticles. In another embodiment, the feature is disposed on a substantially non-porous substrate. In this embodiment, the feature optionally comprises a color shifting reflective feature.

In another embodiment, the invention is to a color shifting feature, e.g., a reflective security feature or a reflective decorative feature, comprising nanoparticles; and preferably a colorant. The color shifting may be observable as a position of a light source is moved, as the feature is moved, as an observer's position is moved, or a combination thereof.

The colorant preferably modifies a spectrum of light that is reflected by the reflective layer. The reflective layer optionally comprises the nanoparticles and optionally the colorant, the reflective layer having a root mean square surface roughness that is less than about 100 nm. The nanoparticles and the colorant optionally are homogenously mixed.

In a preferred embodiment, the feature displays variable information, optionally alphanumeric variable information. In one aspect, the feature comprises a negative image, the negative image comprising the nanoparticles, and the inverse of the negative image forms the variable information. In this embodiment, the feature optionally comprises a colorant layer comprising the colorant, the colorant layer covering at least a portion of the negative image.

In one aspect, the reflective layer is disposed on a substrate and the colorant is in a second layer disposed on the reflective layer. The second layer optionally further comprises a polymer or a varnish. In another embodiment, the colorant is in a second layer disposed on a substrate and the reflective layer is disposed on the second layer.

Optionally, the feature is disposed on a substrate comprising a supporting material and a coating on the supporting material, the feature being disposed on the coating. In this embodiment, the nanoparticles and the colorant optionally are disposed on top of the coating.

The nanoparticles optionally comprise a metallic composition, which optionally comprises a metal selected from the group consisting of silver, gold, copper, nickel, cobalt, palladium, platinum, indium, tin, zinc, titanium, chromium, tantalum, tungsten, iron, rhodium, iridium, ruthenium, osmium and lead. In another embodiment, the metallic composition comprises an alloy comprising at least two metals, each of the two metals being selected from the group consisting of silver, gold, copper, nickel, cobalt, palladium, platinum, indium, tin, zinc, titanium, chromium, tantalum, tungsten, iron, rhodium, iridium, ruthenium, osmium and lead. The nanoparticles optionally further comprise a dielectric composition selected from the group consisting of silica, zirconia, zinc oxide and titania.

In the color shifting embodiments, the feature optionally comprises a first layer on a substrate surface, the first layer comprising the nanoparticles, and a second layer disposed on the first layer, the second layer comprising interference particles. Each interference particle optionally comprises a first metal oxide core having opposing major planar surfaces, and a second metal oxide disposed on the opposing major planar surfaces. The first metal oxide optionally is selected from the group consisting of: silica, titania and mica, and the second metal oxide is different from the first metal oxide but also optionally is selected from the group consisting of: silica, titania and mica.

In another embodiment, the invention is to an ink suitable for direct write printing, comprising: (a) nanoparticles; (b) a colorant; and (c) a vehicle. The vehicle optionally comprises at least 50 wt. % water, based on the total weight of the vehicle. The ink optionally has a viscosity of not higher than about 50 centipoise. The ink optionally has a surface tension of from about 10 dynes/cm to about 50 dynes/cm.

In another embodiment, the invention is to a process for forming a reflective feature, the process comprising the steps of: (a) providing an ink (e.g., the above-described ink) comprising nanoparticles, a colorant, and a vehicle; and (b) depositing, e.g., direct write printing, the ink onto a substrate under conditions effective to form the reflective feature. The direct write printing preferably comprises piezo-electric, thermal, drop-on-demand or continuous ink jet printing. The deposited ink optionally is heated to form the feature. The deposited ink optionally is cured with heat or UV radiation to form the feature. The nanoparticles and the colorant optionally are homogenously mixed after the depositing step.

In another embodiment, the invention is to a process for forming a reflective feature, the process comprising the steps of: (a) providing a first ink comprising nanoparticles and a first vehicle; (b) providing a second ink comprising a colorant and a second vehicle; and (c) depositing the first and second inks onto a substrate under conditions effective to form the reflective feature. Optionally, the nanoparticles and the colorant are homogenously mixed after the depositing step, or are disposed in separate layers form one another. At least one of the first vehicle and/or the second vehicle optionally comprises at least 50 wt. % water, based on the total weight of the vehicle.

In this embodiment, the depositing optionally comprises depositing the first ink on the substrate and depositing the second ink on the first ink, optionally after curing the first ink. Thus, in one aspect, the feature comprises a first layer comprising the nanoparticles disposed on the substrate and a second layer comprising the colorant, optionally comprising interference particles, disposed on the first layer. Each interference particle optionally comprises a first metal oxide core having opposing major planar surfaces, and a second metal oxide disposed on the opposing major planar surfaces. The first metal oxide optionally is selected from the group consisting of: silica, titania and mica, and the second metal oxide is different from the first metal oxide but also optionally is selected from the group consisting of: silica, titania and mica. In one embodiment, the second layer further comprises a polymer or a varnish.

Optionally, the depositing comprises depositing the second ink on the substrate and depositing the first ink on the second ink, optionally after curing the second ink. Thus, in one aspect, the feature comprises a second layer comprising the colorant disposed on the substrate and a first layer comprising the nanoparticles disposed on the second layer.

The depositing preferably comprises direct write printing, e.g., piezo-electric, thermal, drop-on-demand or continuous ink jet printing, at least one of the first ink and/or the second ink. At least one of the first ink and/or the second ink optionally is heated to form the feature. Optionally, at least one of the first ink and/or the second ink is cured with UV radiation to form the feature.

BRIEF DESCRIPTION OF THE DRAWINGS

The present invention will be better understood in view of the appended non-limiting figures, wherein.

DETAILED DESCRIPTION OF THE INVENTION

INTRODUCTION

In one embodiment, the present invention relates to a reflective feature, e.g., a reflective security feature or a reflective decorative feature, preferably disposed on a substrate, the feature comprising a reflective layer comprising nanoparticles, and a colorant, which preferably modifies a spectrum of light, e.g., a visible spectrum, a UV spectrum or an IR spectrum, that is reflected by the reflective layer. As used herein, the term "security feature" means a feature that is placed on or otherwise incorporated into an article (e.g., a tag or label, a document such as a passport, check, bond, banknote, currency, ticket, etc.), directly or indirectly, for the purpose of authenticating the article. As used herein, the term "decorative feature" means a feature that is not provided primarily for an authentication purpose, but rather primarily for a graphical or decorative purpose.

The colorant may modify the spectrum of light in many possible ways. In a first embodiment, for example, the colorant modifies the light that is reflected by the reflective layer so that the layer appears to be a different color or hue, e.g., by absorbing certain wavelengths of the incident light. In a second embodiment, the colorant modifies the spectrum of light reflected by the film, such that the feature exhibits a color shifting effect, meaning the feature exhibits a change in color as the feature is viewed at different angles, as the feature is moved, as the position of a light source is moved, or a combination thereof. The combination of employing nanoparticles and a colorant in a feature, e.g., a security feature or decorative feature, provides the ability to form highly reflective colored features that are very difficult to reproduce, for example, by would-be counterfeiters.

In another aspect, the invention is to an ink suitable for direct write printing, e.g., ink jet printing, the ink comprising nanoparticles that preferably can form a reflective layer, a colorant that preferably is capable of modifying a spectrum of light that is reflected by the reflective layer; and a vehicle. The ink preferably has a viscosity of less than about 50 centipoise and a surface tension of from about 10 dynes/cm to about 50 dynes/cm. These viscosity and surface tension characteristics render the ink suitable for direct write printing, such as piezoelectric, thermal, drop-on-demand, or continuous ink jet printing.

In another aspect, the invention is to various processes for forming reflective features, e.g., reflective security features or reflective decorative features. For example, in one aspect, the invention is to a process for forming a reflective feature, e.g., a reflective security feature or reflective decorative feature, the process comprising the steps of: (a) providing an ink comprising nanoparticles that preferably are capable of forming a reflective layer, a colorant preferably capable of modifying a spectrum of light that is reflected by the reflective layer, and a vehicle; and (b) depositing the ink (for example, in a direct write printing process such as an ink jet printing process) onto a substrate under conditions effective to form the reflective feature.

In another embodiment, the reflective feature, e.g., reflective security feature or reflective decorative feature, is formed from at least two different inks, one of which provides the nanoparticles and the other of which provides the colorant preferably capable of modifying a spectrum of light that is reflected by a reflective layer formed from the nanoparticles. Thus, in this embodiment, the invention is to a process for forming a reflective feature, the process comprising the steps of: (a) providing a first ink comprising nanoparticles and a first vehicle; (b) providing a second ink comprising a colorant and a second vehicle, the colorant preferably being capable of modifying a spectrum of light that is reflected by a reflective layer formed from the nanoparticles; and (c) depositing the first and second inks onto a substrate under conditions effective to form the reflective feature.

Features

Overview

As indicated above, in a first embodiment, the present invention is directed toward a feature, e.g., a reflective feature, preferably a reflective security feature or reflective decorative feature, optionally disposed on a substrate, the feature comprising a reflective layer comprising nanoparticles and a colorant that preferably modifies a spectrum of light that is reflected by the reflective layer.

Figure 1:
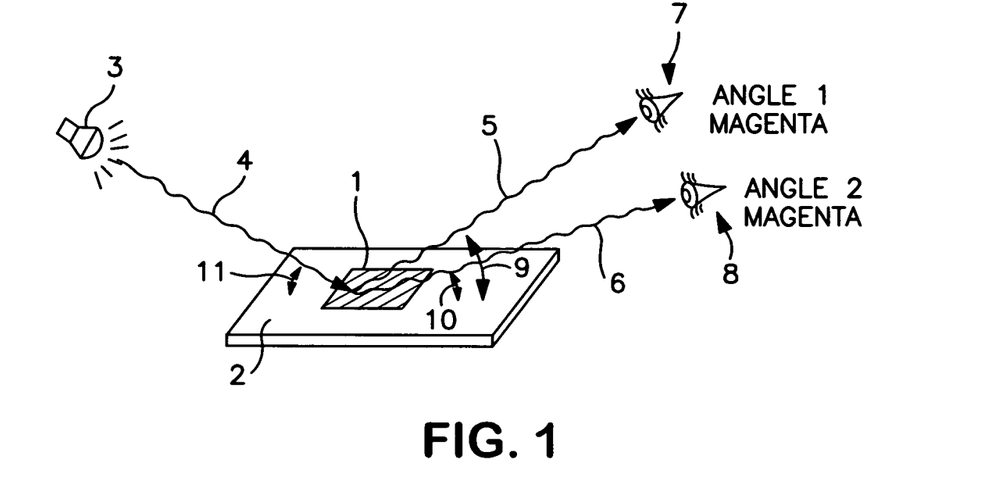
FIG. 1 illustrates a reflective feature exhibiting consistent reflective color characteristics according to one embodiment of the present invent.

In one embodiment, the colorant modifies the color of the light that is reflected off of the reflective layer to provide a feature having consistent color characteristics when viewed at different angles. FIG. 1 illustrates this embodiment of the present invention, wherein a colorant modifies the color of the light that is reflected off of the reflective layer. The reflective feature 1 shown in FIG. 1 also exhibits color constancy, meaning the feature exhibits the same color when viewed at different angles. That is, the reflective feature 1 does not exhibit color shifting. The reflective feature 1 in FIG. 1 comprises a reflective layer formed of metallic nanoparticles (e.g., a silver nanoparticle layer that in the absence of a colorant would reflect silver specular light) and a red colorant. Of course, due to their extremely small size, the nanoparticles and colorant are not distinguishable in the figure.

As shown, a point light source 3, e.g., a lightbulb, produces light radiation 4, which is directed toward feature 1 on substrate surface 2 at angle of incidence 11. The incoming light radiation 4 is reflected off of the feature 1 toward a first observer 7 as shown by the first reflected radiation 5 at first viewing angle 9. As shown in the figure, to the first observer 7, the feature 1 appears to exhibit a magenta metallic color rather than the native color of the bulk composition contained in the metal nanoparticles, e.g., silver in the case of silver nanoparticles. Similarly, the incoming light radiation 4 is reflected off of the feature 1 toward a second observer 8 as shown by the second reflected radiation 6 at second viewing angle 10. As shown in the figure, to the second observer 8, the feature 1 also appears to exhibit a magenta metallic color. The spectrum of light reflected off of the reflective layer formed by the nanoparticles in the reflective feature 1 has been modified by the colorant to make the feature appear a magenta metallic color. No color shifting is observed. Of course, any colorant may be employed in the present invention so long as it can modify the spectrum of light (e.g., visible light, UV light and/or IR light) reflected by the reflective layer, as desired.

For features having color constancy, the apparent color of the feature may be any color in the visible spectrum. For example, the apparent color may be selected from the group consisting of: red, orange, yellow, green, blue, indigo, violet, copper, gold, magenta, cobalt blue, and silver. Preferably, the apparent color comprises a metallic color selected from the group consisting of: metallic red, metallic orange, metallic yellow, metallic green, metallic blue, metallic indigo, metallic violet, metallic copper, metallic gold, metallic magenta, metallic cobalt blue, and metallic silver.

Table 1, below, provides some non-limiting specific nanoparticle/colorant combinations that may be employed in the features, e.g., reflective security features or reflective decorative features, of the present invention as well as the respective colors that may be exhibited as the feature is observed. This table relates to features having color constancy, i.e., that do not exhibit color shifting.

TABLE 1

VARIOUS NANOPARTICLE/COLORANT COMBINATIONS AND CORRESPONDING COLOR MODIFICATION FOR COLOR CONSISTENT FEATURES

| Nanoparticle (Native Color) | Colorant | Modified Colors |
| --- | --- | --- |
| Silver (Silver) | Rhodamine (Red) | Magenta or Copper |
| Silver (Silver) | Basic Red 29 (Red) | Magenta or Copper |
| Silver (Silver) | Basic Fuchsin (Red) | Magenta or Copper |
| Silver (Silver) | Acid Yellow 14 (Yellow) | Gold |
| Silver (Silver) | Auramine O (Yellow) | Gold |
| Silver (Silver) | Basic Yellow 11 (Yellow) | Gold |
| Silver (Silver) | Acid Blue 129 (Blue) | Cobalt blue |
| Silver (Silver) | Indigo (Blue) | Metallic Blue |
| Gold (Gold) | Rhodamine (Red) | Copper |
| Gold (Gold) | Basic Red 29 (Red) | Copper |
| Gold (Gold) | Basic Fuchsin (Red) | Copper |
| Gold (Gold) | Acid Yellow 14 (Yellow) | Yellow-Gold |
| Gold (Gold) | Auramine O (Yellow) | Yellow-Gold |
| Gold (Gold) | Basic Yellow 11 (Yellow) | Yellow-Gold |
| Gold (Gold) | Acid Blue 129 (Blue) | Cobalt Blue |
| Gold (Gold) | Indigo (Blue) | Metallic Blue |

Figure 2:
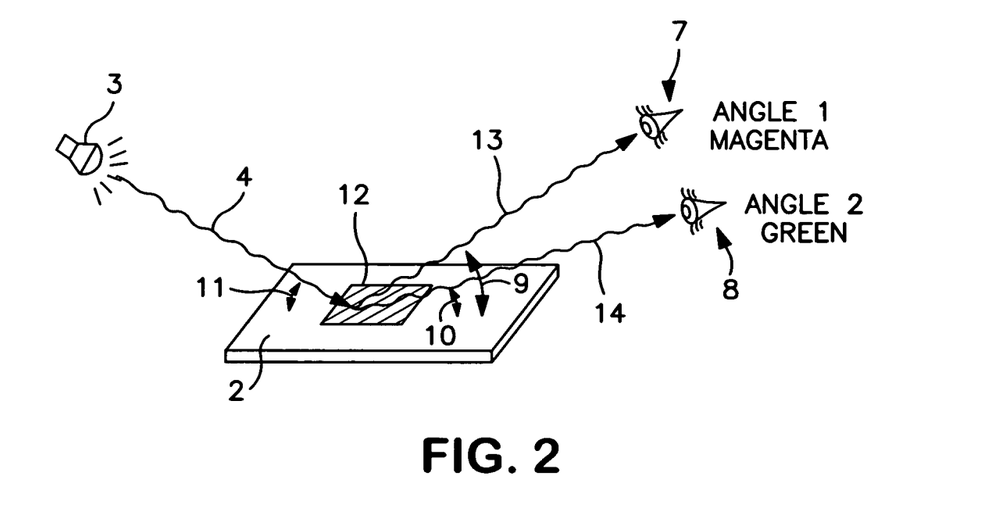
FIG. 2 illustrates a reflective feature exhibiting color shifting according to one embodiment of the present invention.

In a second embodiment, the colorant modifies a spectrum of light reflected by the reflective layer formed form the nanoparticles such that the reflective feature exhibits "color shifting," meaning the reflective feature exhibits a change in color as the feature is viewed at different angles, as the feature is moved, as the position of a light source is moved, or a combination thereof. FIG. 2 illustrates a reflective feature according to this embodiment of the present invention. As shown, a point light source 3, e.g., light bulb, produces light radiation 4, which is directed toward the feature 12 on substrate surface 2 at angle of incidence 11. The incoming light radiation 4 is reflected off of the feature 12 toward a first observer 7 as shown by the first reflected radiation 13 at first viewing angle 9. As shown in the figure, to the first observer 7, the feature 12 appears to exhibit a metallic magenta color. The incoming light radiation 4 is reflected off of the feature 12 toward a second observer 8 as shown by the second reflected radiation 14 at second viewing angle 10. As shown in the figure, to the second observer 8, unlike in FIG. 1, the feature 12 appears to exhibit a metallic green color (rather than a metallic magenta color). Feature 12 exhibits color shifting.

In either embodiment, the first angle optionally differs from the second angle by more than 1 degree, more than 5 degrees, more than 10 degrees more than 15 degrees or more than 20 degrees. In terms of ranges, the first angle optionally differs from the second angle by from about 1 to about 80 degrees, from about 5 to about 45 degrees, or from about 10 to about 25 degrees.

Figure 3:
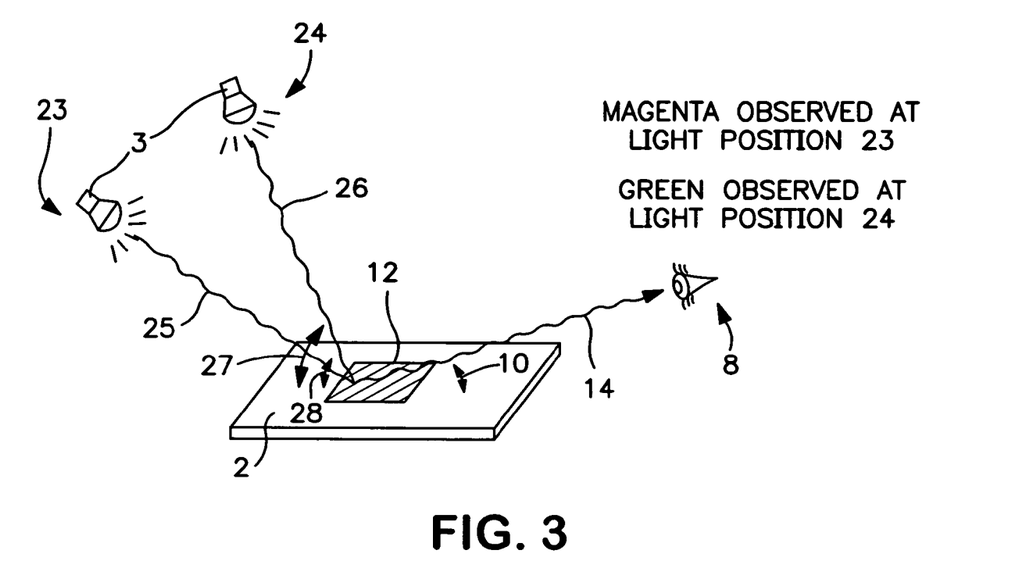
FIG. 3 illustrates a reflective feature exhibiting color shifting according to one embodiment of the present invention.

FIG. 3 illustrates another color shifting effect of feature 12, discussed above in FIG. 2. Specifically, FIG. 3 shows that the feature 12 may shift between two or more colors as the position of the light source 3 changes, but as the observer 8 and feature 12 remain stationary. As shown, a point light source 3, e.g., light bulb, in first position 23 produces first light radiation 25, which is directed toward feature 12 on substrate surface 2 at first angle of incidence 28. The incoming first light radiation 25 is reflected off of the feature 12 toward an observer 8 as shown by reflected radiation 14 at viewing angle 10. As shown in the figure, to the observer 8, the feature 12 appears to exhibit a metallic magenta color. As the point light source 3 is moved to a second position 24, however, the light source 3 produces second light radiation 26, which is directed toward feature 12 on substrate surface 2 at second angle of incidence 27. The incoming second light radiation 26 is reflected off of the feature 12 toward observer 8 as shown by reflected radiation 14 at viewing angle 10. As shown in the figure, when light source 3 is in second position 24, the feature 12 appears to the observer 8 to exhibit a metallic green color rather than a metallic magenta color.

Figure 4:
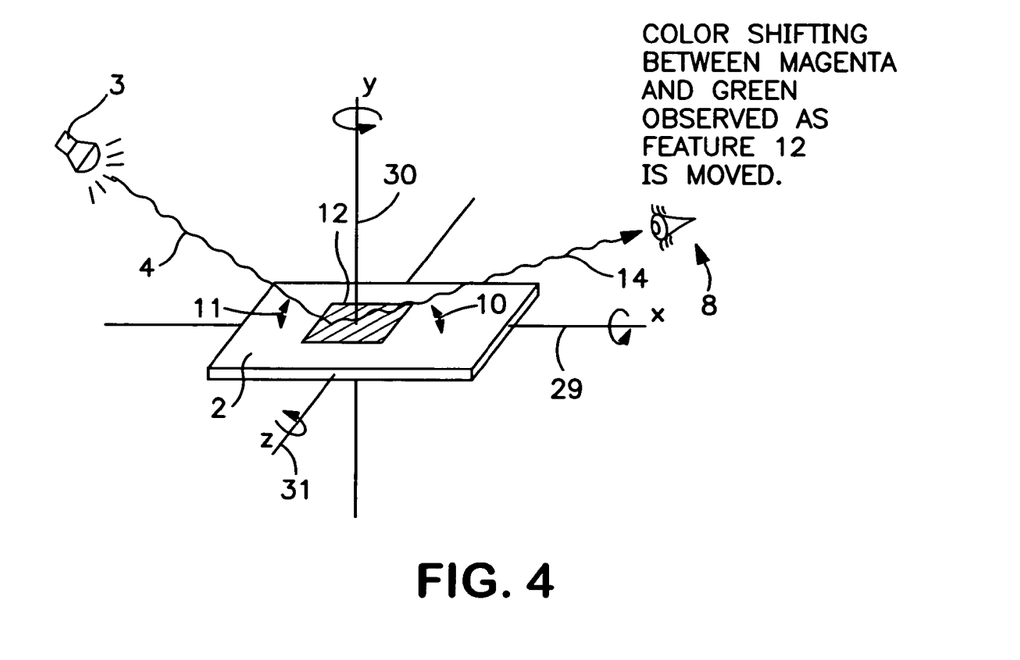
FIG. 4 illustrates a reflective feature exhibiting color shifting according to one embodiment of the present invention.

FIG. 4 illustrates another color shifting effect of feature 12, discussed above in FIGS. 2 and 3. Specifically, FIG. 4 shows that the feature 12 may shift between two or more colors as the position of the feature 12 changes, but as the observer 8 and light source 3 remain stationary. FIG. 4 illustrates the three axes (x-axis 29, y-axis 30 and z-axis 31) about which the feature may be rotated or moved to create a color shifting effect. It is also contemplated that the feature may exhibit color shifting as it is physically moved to a different position outside of these three axes. As shown, a point light source 3, e.g., light bulb, produces first light radiation 4, which is directed toward feature 12 on substrate surface 2 at an angle of incidence 11. The incoming light radiation 4 is reflected off of the feature 12 toward an observer 8 as shown by reflected radiation 14 at viewing angle 10. As shown in the figure, to the observer 8, the feature 12 appears to exhibit a metallic magenta color. As the feature 12 is moved to a second position (e.g., about one or more of the three axes), however, the light radiation 4 is reflected off of the feature 12 toward observer 8 as shown by reflected radiation 14 at viewing angle 10, but at a different color, e.g., a metallic green color.

Thus, as discussed above with reference to FIGS. 2-4, in one embodiment, the invention is to a color shifting feature comprising a reflective layer comprising nanoparticles. The feature, e.g., the reflective layer thereof, preferably further comprises a colorant. The color shifting may be observable as an observer's position is moved, as described above with reference to FIG. 2. Additionally or alternatively, the color shifting may be observable as a position of a light source is moved, as described above with reference to FIG. 3. Additionally or alternatively, the color shifting may be observable as the feature is moved, as described above with reference to FIG. 4.

The relative amounts of nanoparticles and colorant in the reflective feature, e.g., in the reflective layer thereof, may vary widely depending, for example, on the optical properties of the colorant and the desired effect for the reflective feature. In various embodiments, the reflective feature comprises at least about 40 weight percent nanoparticles, e.g., at least about 60 weight percent nanoparticles, at least about 70 weight percent nanoparticles, or at least about 99 weight percent nanoparticles, based on the weight of the reflective feature. The reflective feature optionally comprises at least about 1 weight percent colorant, e.g., at least about 10 weight percent colorant, at least about 20 weight percent colorant, or at least about 50 weight percent colorant, based on the weight of the reflective feature.

The degree of mixing of the nanoparticles in the reflective features, e.g., reflective security features or reflective decorative features, of the present invention may vary depending on, for example, on how the reflective feature was formed. For example, the degree of mixing is generally more homogenous if formed from a single ink rather than from multiple inks. In one preferred embodiment, for example, the nanoparticles and the colorant are homogenously mixed, meaning they cannot be distinguished from one another without the assistance of analytical equipment, e.g., a magnifying glass, loop or microscope. Alternatively, the nanoparticles and colorant are not homogenously mixed with one another. For example, the nanoparticles may be in a first layer, e.g., the reflective layer, and the colorant in a second layer. In this embodiment, the first layer, e.g., reflective layer, may be disposed on the second layer, which is disposed on a substrate surface, or, alternatively, the second layer may be disposed on the first layer, e.g., reflective layer, which is disposed on a substrate surface.

The colors that may be observable in a given feature according to this embodiment of the invention vary widely depending, for example, on the specific nanoparticles and colorants present in the feature. Although the feature may exhibit more than two colors at more than two viewing angles, in its basic form, the color shifting reflective features of the present invention exhibit a first color at a first viewing angle (relative to the surface of the feature) and a second color at a second viewing angle.

For the color shifting reflective features, the first color may be any color in the visible spectrum. For example, the first color may be selected from the group consisting of: red, orange, yellow, green, blue, indigo, violet, copper, gold, magenta, cobalt blue, and silver, or any metallic color thereof. The second color similarly may be any color in the visible spectrum, so long as the second color is distinguishable to an observer from the first color. The second color may similarly be selected from the group consisting of: red, orange, yellow, green, blue, indigo, violet, copper, gold, magenta, cobalt blue, and silver, or any metallic color thereof. In a preferred embodiment, either or both the first color and the second color comprise metallic colors, meaning they possess a metallic luster. A non-limiting list of several preferred color shifts include: magenta/green, blue/yellow, red/cyan, or other complementary color combinations.

It is also contemplated that the first and second colors may be any colors in the IR spectrum or the UV spectrum. That is, "color" as used herein refers to any wavelength of electromagnetic radiation, whether discernable to the naked eye or requiring the assistance of a detector (e.g., an IR detector of a UV detector). It is also contemplated that the feature may exhibit an IR shift or a UV shift as the feature is viewed at different angles, as the feature is moved, as the position of a (UV or IR) light source is moved, or a combination thereof.

In one particularly preferred embodiment, the feature, e.g., the reflective layer thereof, comprises silver nanoparticles and a red colorant such as rhodamine or basic fuchsin red, and the reflective feature, e.g., reflective security feature or reflective decorative feature, exhibits a color shift between a magenta metallic color at a first angle and a green metallic color at a second angle.

The porosity of the substrate may play an important role in determining whether the feature, e.g., reflective security feature or reflective decorative feature, exhibits color constancy or color shifting. To impart color shifting properties, the colorant should be primarily disposed on the surface of the substrate rather than within the pores of the substrate, e.g., through bleeding or wicking of the ink that comprises the colorant into the substrate pores. If the colorant is allowed to selectively bleed or wick into the substrate, for example through pores in the substrate, the colorant will not be able to impart color shifting properties. Some colorants, for example, may bleed into highly porous substrates, thereby changing the apparent color of the feature relative to the native color of the bulk material contained in the nanoparticles contained therein as discussed above with reference to FIG. 1, but failing to impart (or reducing the effect of) color shifting properties as discussed above with reference to FIG. 2. These same colorants, on the other hand, may remain substantially on the surface of a nonporous substrate thereby maximizing the color shifting properties of the reflective feature.

A security element that may be observed with features, e.g., reflective security features or reflective decorative features, formed on porous substrates is a creation of a "halo" effect. With the halo effect, the colorant is selectively wicked into the substrate (relative to the nanoparticles) through pores therein and remains distinguishably separate from the reflective nanoparticle regions (e.g., reflective layer) in the feature. The wicking of the colorant may form a shadow or "coffee stain" effect around the nanoparticle regions, at least on a microscopic scale. That is, for reflective features formed on porous substrates, the colorant may form a halo around a reflective image formed from the reflective layer comprising the nanoparticles. In this embodiment, the substrate preferably is substantially porous, meaning that the substrate is sufficiently porous to allow wicking of at least 50 weight percent, preferably at least 70 weight percent, and more preferably at least 80 weight percent, of the colorant in the reflective feature.

Figure 5:
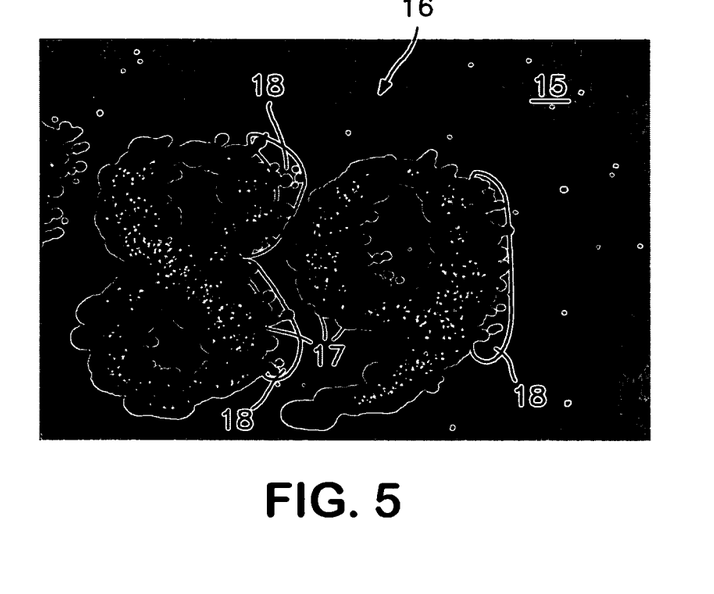
FIG. 5 presents an image of a reflective feature having a halo effect according to one embodiment of the present invention.

FIG. 5 presents a feature 16 comprising an image in the form of the numerals "8" and "9" on substrate 15, wherein the feature 16 exhibits this halo effect. The feature 16 comprises localized reflective layer 17 comprising nanoparticles. Surrounding the edge of the numerals "8" and "9" formed by these reflective layer 17 is a colorant halo 18. In this feature 16, the reflective layer 17 comprises silver nanoparticles and the halo is formed from rhodamine dye. The halo effect provides additional security that is highly difficult to reproduce for a would-be counterfeiter. Feature 16 also exhibits color constancy.

In one embodiment, the halo effect is formed from a luminescent colorant. Coupling luminescent colorants with the halo effect may be desirable because the luminescence of the colorant may be more easily observed when the colorant has separated from the nanoparticles as a halo than in a feature in which a luminescent colorant is more homogenously mixed with the nanoparticles.

In another embodiment, the colorant selectively permeates a first surface of a substrate, which acts essentially as chromatography paper, and is transferred to the opposite surface, e.g., second surface, of the substrate. In this embodiment, after an ink or inks comprising nanoparticles and a colorant are printed on the substrate, the nanoparticles remain on the first substrate surface thereof, but the colorant selectively permeates or bleeds through the substrate to the other (second) side of the substrate. In this embodiment, since the colorant is transferred away from the nanoparticles, the degree to which the colorant modifies the spectrum of light reflected by the reflective layer is generally less than in embodiments where the colorant remains in closer proximity to (or even within) the reflective layer.

In a preferred embodiment, the reflective feature, e.g., the reflective layer thereof, comprises an image. The image may be formed from a conventional colored ink and/or from a metallic ink, e.g., an ink comprising metallic nanoparticles. The form of the image may vary widely, but may include, for example, a geometric image or shape, design, alphanumeric characters, microimages (equal to or less than 2 pt font in size), image of an individual, photograph, fingerprint, guilloche patterns, etc. The image may be formed by virtually any printing process, such as, for example, stamping, intaglio, roll printer, spraying, dip coating, spin coating, lithographic printing or gravure printing.

In one embodiment, the feature, e.g., reflective security feature or reflective decorative feature, is disposed, e.g., printed, over an underlying image, the image preferably being at least partially visible through the feature when viewed at one angle. The image may become obscured, however, when viewed from another angle, relative to the surface of the feature. The effect of obscuring an underlying image is further described in co-pending U.S. patent application Ser. No. 11/331,233, filed Jan. 13, 2006, entitled "Security Features, Their Use and Processes for Making Them," the entirety of which is incorporated herein by reference.

In another embodiment, an overlying security element, e.g., image, is disposed over, e.g., on top of, the feature. The overlying security element may be formed from a conventional ink or a metallic ink. In this embodiment, the overlying security element optionally comprises an image that is disposed on top of at least a portion of the reflective feature. Optionally, the overlying security element is clearly visible when viewed from one angle (a first angle) and the overlying security element is at least partially obscured when viewed from another angle (a second angle).

In one embodiment, the feature, e.g., reflective security feature or reflective decorative feature, comprises (or displays) variable information. As used herein, the term "variable information" means information that is individualized for a product unit, such as, but not limited to, serialized data. For example, a serial number is one non-limiting type of variable information. Other types of variable information include: counters, lettering, sequential symbols, alphanumeric variable information, non-serialized variable information (variable information that is not sequential), and combinations thereof.

The formation of features comprising variable information is made possible, for example, by employing a direct-write printing process, e.g., an ink jet printing process, to form the features. In addition to being able to individualize a document, tag, etc., the ability to incorporate variable information in a feature, e.g., reflective security feature or reflective decorative feature, provides even further anti-counterfeiting measures not recognized or available until now. For even further increased security, the feature optionally comprises variable information such as a serial number comprising a plurality of numbers. At least one of the numbers may exhibit a first color and at least one other of the numbers may exhibit a second color, different from the first color. In effect, a serial number comprises multiple numbers, each of which may be characterized as a separate feature having a different color or hue. That is, each of these numbers (features) may, in turn, be individualized by including a different colorant and/or nanoparticle combination.

Figure 6:
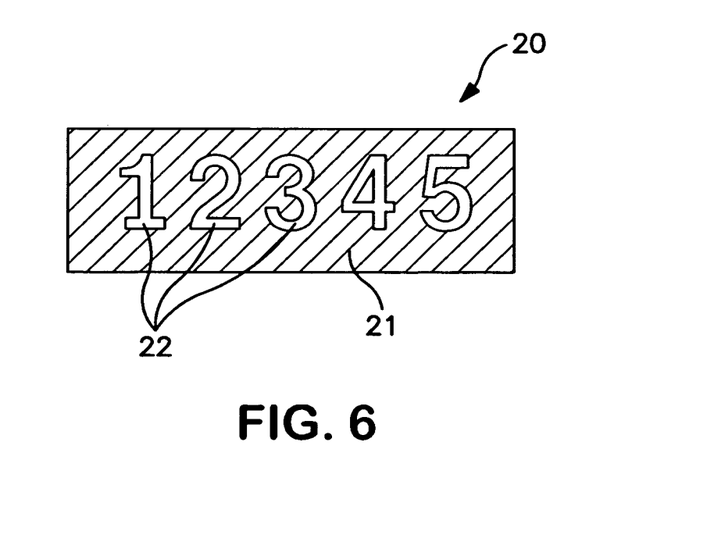
FIG. 6 presents a reflective feature having a negative region that defines variable information.

In another embodiment, the feature, e.g., reflective security feature or reflective decorative feature, comprises a negative of an image, e.g., a negative of variable information. In this context, "negative" means that the feature comprising the nanoparticles and colorant forms a background image defining a region that forms an image, e.g., variable information. That is, in this embodiment, the reflective feature comprises a negative image comprising the nanoparticles and preferably the colorant, and the inverse of the negative image forms the image, e.g., the variable information. FIG. 6 illustrates a feature 20 comprising nanoparticles and colorant in negative region 21, the negative region defining a region 22 that forms the variable information—here, the number "12345". In effect, this aspect of the invention gives the appearance that the variable information has been printed on a colored reflective background feature (which optionally exhibits color shifting, as discussed above). Optionally, the feature 20 is formed on a substrate having particular additional features such as a specific color, pattern, hologram, water mark, reflective characteristic, etc., to provide even further increased security or decoration.

In another aspect, the invention is to a color shifting multi-layer reflective feature, e.g., a color shifting multi-layer reflective security feature or color shifting multi-layer reflective decorative feature, comprising a first layer, e.g., reflective layer, comprising nanoparticles disposed on a substrate surface, and a second layer comprising interference particles disposed on the first layer, e.g., reflective layer. In this embodiment, the nanoparticles in the first layer, e.g., reflective layer, preferably comprise metallic nanoparticles, discussed in more detail below. The interference particles preferably comprise pre-fabricated flakes, which cause the reflective feature to exhibit color shifting properties. In one embodiment, the second layer comprises or is formed from a Fabry-Perot interference pigment, e.g., a pigment comprising an Al core and having a first coating comprising $MgF_2$ and a second coating comprising a thin layer of semitransparent Cr. This embodiment beneficially can provide a color shift, potentially a unique color shift, with even greater intensity and/or metallic appearance.

In a preferred embodiment, each interference particle comprises a flake core comprising a first metal oxide, the flake core having opposing major planar surfaces. The particle also preferably comprises a second metal oxide disposed on the opposing major planar surfaces of the first metal oxide so as to create a three-tiered structure comprising a first metal oxide layer (core) disposed between adjacent second metal oxide layers. In this aspect, the first and second metal oxides preferably have different refractive indexes so as to create a multiple interference effect giving rise to a "metal-effect" phenomenon. Table 2, below, provides some exemplary non-limiting combinations of metal oxides that may be employed in the interference particles.

TABLE 2

EXEMPLARY INTERFERENCE PARTICLE COMPOSITIONS

| Second Metal Oxide Layer* | First Metal Oxide Layer (Core) | Second Metal Oxide Layer** |
|---|---|---|
| Silica | Titania | Silica |
| Silica | Mica | Silica |
| Titania | Mica | Titania |
| Titania | Silica | Titania |
| Mica | Silica | Mica |
| Mica | Titania | Mica |

*e.g., on a first surface of the First Metal Oxide Layer
**e.g., on a second surface of the First Metal Oxide Layer In a preferred embodiment, the first layer comprising the nanoparticles displays variable information, e.g., serial information. The combination of color shifting with variable information provides a unique feature, e.g., reflective security feature or reflective decorative feature, that is very difficult to reproduce.

Nanoparticles

The reflective layers formed from the nanoparticles in the reflective features, e.g., reflective security features or reflective decorative features, of the present invention, as well as the reflective features themselves, are preferably highly reflective. By "highly reflective," it is meant that the reflective layers and the reflective features themselves exhibit at least some degree of non-diffuse or non-Lambertian reflectivity. That is, the reflective layers and the reflective features preferably exhibit some degree of specular reflectivity, preferably some degree of colored specular reflectivity. It is contemplated, however, that the reflective layers and/or features may exhibit some degree of diffuse reflectivity, in addition to specular reflectivity. As a percentage of incident light, the reflective layers in the reflective features and the features themselves preferably reflect greater than 60%, greater than 80% or greater than 90% of the incident light as specular reflectance. In another embodiment, as a percentage of incident light, the reflective layers in the reflective features and the features themselves reflect less than 60%, less than about 40%, less than about 20%, less than about 10%, or less than about 5% of the incident light as specular reflectance. Optionally, the reflective layers in the reflective features have a matte reflectance. In one embodiment, the nanoparticles in the reflective layers comprise metallic nanoparticles. Security elements, e.g., reflective layers, comprising metallic nanoparticles have been found to exhibit enhanced reflectivity, particularly enhanced specular reflectivity, over conventional features.

As used herein, the term "metallic nanoparticles" means particles comprising a metal or metallic characteristic and having an average particle size of less than about 1 μm. One skilled in the art would appreciate that there are many techniques for determining the average particle size of a population of particles, scanning electron microscopy (SEM) being a particularly preferred technique. The average particle size of particles smaller than about 1 μm is also determinable using quasi-elastic light scattering (QELS) techniques (e.g., using a Malvern™ ZetaSizer™). By "comprising a metal" it is meant all or a portion of the particles include, in whole or in part, a metal (e.g., an elemental metal (zero oxidation state) or a mixture or alloy of metals) or a metal-containing compound (e.g., a metal oxide or metal nitride). Thus, in a preferred embodiment, the metallic nanoparticles comprise a component selected from the group consisting of a metal, a metal alloy, and a metal-containing compound (e.g., a metal oxide). Additionally or alternatively, the metallic nanoparticles may comprise a component having a metallic characteristic. The term "metallic characteristic" means a reflective or lustrous optical property similar to a metal. For example, a component may exhibit a metallic characteristic by virtue of it having a small electronic band gap.

As indicated above, the nanoparticles, e.g., metallic nanoparticles, preferably have an average particle size of less than about 1 μm. In another embodiment, the nanoparticles have an average particle size of less than about 500 nm, more preferably less than about 250 nm, even more preferably less than about 100 nm, and most preferably less than about 80 nm. The nanoparticles optionally have an average particle size greater than about 5 nm, greater than about 10 nm, greater than about 20 nm, greater than about 25 nm, greater than about 30 nm, greater than about 40 nm, greater than about 50 nm, greater than about 100 nm, greater than about 250 nm or greater than about 500 nm. In terms of ranges, the nanoparticles optionally have an average particle size in the range of from about 20 nm to about 1 μm, from about 25 nm to about 1 μm, from about 30 nm to about 1 μm, from about 40 nm to about 1 μm, from about 50 nm to about 500 nm, from about 20 nm to about 100 nm, from about 50 nm to about 100 nm, or from about 50 nm to about 80 nm. The nanoparticles may have a unimodal or multi-modal (e.g., bimodal, trimodal, etc.) particle size distribution.

Additionally, in the reflective layers and reflective features of the invention (although preferably not in the inks of the invention), the nanoparticles may be necked with adjacent nanoparticles. By necking it is meant that adjacent particles are physically connected to one another through a necking region, while retaining at least some recognizable degree of their original, e.g., spherical, form. The degree of necking will vary widely depending, for example, on the composition (and melting point) of the nanoparticles and on the treating, e.g., curing, conditions employed in forming the features.

Non-limiting examples of metals for use in the metallic nanoparticles and features of the present invention include transition metals as well as main group metals such as, for example, silver, gold, copper, nickel, cobalt, palladium, platinum, indium, tin, zinc, titanium, chromium, tantalum, tungsten, iron, rhodium, iridium, ruthenium, osmium, lead and mixtures thereof. The metallic nanoparticles optionally comprise an alloy comprising at least two metals being selected from the group consisting of: silver, gold, copper, nickel, cobalt, palladium, platinum, indium, tin, zinc, titanium, chromium, tantalum, tungsten, iron, rhodium, iridium, ruthenium, osmium, and lead. Non-limiting examples of preferred metals for use in the present invention include silver, gold, zinc, tin, copper, nickel, cobalt, rhodium, palladium and platinum—silver, copper and nickel being particularly preferred. The metallic nanoparticles optionally comprise a metal selected from the group consisting of silver, gold, zinc, tin, copper, platinum and palladium or a combination thereof. Non-limiting examples of metal-containing compounds or components that exhibit metallic characteristics and that may be useful as metallic nanoparticles of the features and inks of the present invention include metal oxides, metal nitrides (e.g., titanium nitride or tantalum nitride), metal sulphides and some semiconductors. The metal-containing compound(s) preferably have a small electronic band gap that gives rise to metallic properties or characteristics. A non-limiting list of exemplary metal oxides includes bronzes such as tungsten bronzes including hydrogen tungsten oxide, sodium tungsten oxide and lithium tungsten oxide as well as other bronzes such as phosphor bronzes. Additional tungsten oxides are described in Published U.S. Patent Application No. 2005/0271566A1, which published Dec. 8, 2005, the entirety of which is incorporated herein by reference. In one aspect, the metallic nanoparticles comprise a mineral having a metallic characteristic. A non-limiting list of exemplary minerals suitable for the metallic nanoparticles includes marcasites and pyrites. In another embodiment, the metallic particles and/or the metallic nanoparticles comprise an enamel or a glass/metal composite that provides a metallic characteristic. In one embodiment, the metallic nanoparticles comprise a pearlescent material and/or an opalescent material that provides a metallic characteristic.

The features of the present invention (as well as the inks used to make, form, print, or create the features of the present invention) also, in one embodiment, comprise mixtures of two or more different metallic nanoparticles. In another embodiment, the features of the present invention comprise metallic nanoparticles that comprise two or more metals in the form of an alloy or a mixture of metals or metal containing compounds. Non-limiting examples of alloys useful as metallic nanoparticles of the invention include Cu/Zn, Cu/Sn, Ag/Ni, Ag/Cu, Pt/Cu, Ru/Pt, Ir/Pt and Ag/Co. Optionally, the metallic particles and/or nanoparticles comprise an alloy such as bronze, tungsten bronzes or brass. Also, in an embodiment, the metallic nanoparticles have a core-shell structure made of two different metals such as, for example, a core comprising nickel and a shell comprising silver (e.g. a nickel core having a diameter of about 20 nm surrounded by an about 15 nm thick silver shell). In another embodiment, the core-shell structure may be comprised of a metal oxide core with another metal oxide coating. A non-limiting example is a nanoparticle core-shell structure comprising a mica core and a titania coating. Another non-limiting example is a nanoparticle core-shell structure comprising a silver core and a silica coating, optionally comprising greater than about 90 weight percent silver.

Optionally, the nanoparticles comprise a dielectric composition selected form the group consisting of: silica, zirconia, zinc oxide and titania. In another embodiment, the metallic nanoparticles comprise metal-effect particles and/or pigments. One method for creating metal effect pigments is to deposit thin layers of one metal oxide or ceramic on the surface of another (e.g. $TiO_2$ on mica). Metal-effect pigments are further described in *CENEAR* Vol. 81, No. 44, pp. 25-27 (Nov. 3, 2003) (ISSN 0009-2347), the entirety of which is incorporated herein by reference.

Metallic nanoparticles suitable for use in the features can be produced by a number of methods. For example, the metallic nanoparticles may be formed by spray pyrolysis, as described, for example, in U.S. Provisional Patent Application No. 60/645,985, filed Jan. 21, 2005, or in an organic matrix, as described in U.S. patent application Ser. No. 11/117,701, filed Apr. 29, 2005, the entireties of which are fully incorporated herein by reference. A non-limiting example of one preferred method of making metallic particles and metallic nanoparticles, is known as the polyol process, and is disclosed in U.S. Pat. No. 4,539,041, which is fully incorporated herein by reference. A modification of the polyol process is described in, e.g., P.-Y. Silvert et al., "Preparation of colloidal silver dispersions by the polyol process" Part 1—Synthesis and characterization, J. Mater. Chem., 1996, 6(4), 573-577; Part 2—Mechanism of particle formation, J. Mater. Chem., 1997, 7(2), 293-299, both disclosures of these documents are fully incorporated by reference herein. Briefly, in the polyol process a metal compound is dissolved in, and reduced or partially reduced by a polyol such as, e.g., a glycol, at elevated temperature to afford corresponding metal particles. In the modified polyol process, the reduction is carried out in the presence of a dissolved anti-agglomeration substance, preferably a polymer, most preferably polyvinylpyrrolidone (PVP).

A particularly preferred modification of the polyol process for producing metallic particles, especially metallic nanoparticles, is described in co-pending U.S. Patent Application Ser. Nos. 60/643,577 filed Jan. 14, 2005, 60/643,629 filed Jan. 14, 2005, and 60/643,578 filed Jan. 14, 2005, which are all herein fully incorporated by reference. In a preferred aspect of a modified polyol process, a dissolved metal compound (e.g., a silver compound such as silver nitrate) is combined with and reduced by a polyol (e.g., ethylene glycol, propylene glycol and the like) at an elevated temperature (e.g., at about 120° C.) and in the presence of a polymer, preferably a heteroatom-containing polymer such as PVP.

Colorants

As indicated above, the feature also preferably comprises a colorant that modifies a spectrum of light that is reflected by the reflective layer formed from the nanoparticles. As used herein, the term "colorant" means a dye or pigment as well as any composition (e.g., solid composition) formed from a dye or pigment, any material that modifies any portion of the electromagnetic spectrum of radiation reflected by the reflective layer (e.g., the visible spectrum, IR spectrum and/or UV spectrum), any luminescent material or any phosphorescent material. In a preferred embodiment, the colorant comprises a dye or pigment which alters the color of visible light that is reflected by the reflective layer. Additionally or alternatively, the dye or pigment alters the ultraviolet or infrared spectrum of light reflected by the reflective layer. This aspect of the invention provides an added level of security by providing a covert security element to the reflective feature. In another embodiment, the dye or pigment comprises a phosphor, which may phosphoresce to provide a covert security element. In another embodiment, described above, the colorant comprises interference particles, which alter the color of visible light that is reflected by the reflective layer, e.g., in an underlying reflective layer.

Many colorants are known in the art, and reference may be made to the following documents for listings of other colorants (e.g., dyes, pigments, UV dyes and pigments, IR dyes and pigments, and phosphors) that may be employed in the reflective features, inks and processes of the present invention: Ed. Hugh M. Smith, *High Performance Pigments*, Wiley-VCH Verlag-GmbH, Weinheim, Germany (2002); Ed. Klaus Hunger, *Industrial Dyes*, Wiley-VCH Verlag-GmbH & Co. KGaA, Weinheim, Germany (2003); Heinrich Zollinger, *Color Chemistry*, Wiley-VCH Verlag-GmbH & Co. KGaA, Weinheim, Germany (2003); William M. Yen, *Phosphor Handbook*, CRC Press LLC (1999), the entireties of which are incorporated herein by reference.

The colorant preferably does not (but may in some cases) substantially detract from the reflectivity or luster of the first phase. In this aspect, the pigment or dye may change the apparent color of the reflective layer from the native color of its bulk material (e.g., silver for reflective layers comprising silver nanoparticles) to another color (e.g. gold). Non-limiting examples for colors of dyes and pigments suitable for the colorant include one or more of yellow, green, blue, red, violet, and/or orange dyes or pigments. The metallic color exhibited by the feature by combining nanoparticles (which are reflective when in film or layer form) with a colorant optionally is selected from the group consisting of silver, copper, bronze, gold, and black, as well as a metallic reflectivity or luster of any color of the visible spectrum.

A non-limiting list of exemplary colorants that may be employed in the inks of the present invention, and which may be used to form the reflective features of the present invention, includes: rhodamine, basic red 29, basic fuchsin, acid yellow 14, Auramine O, basic yellow 11, acid blue 129 and indigo.

In one embodiment, the colorant comprises an Infrared (IR) reflective colorant, meaning a colorant that modifies the IR spectrum of light that is reflected by the reflective feature. IR reflective colorants are described in, for example, <http://news.thomasnet.com/fullstory/474510/rss/1303> accessed on May 31, 2006, <http://www.pcimag.com/CDA/Archives/cf5b599d3f6a7010V gnVCM100000f932a8c0> accessed on May 31, 2006, and in Masaru Matsuoka, Ed., *Infared Absorbing Dyes*, Plenum Press (1990), the entireties of which are incorporated herein by reference. A non-limiting list of possible IR reflective colorants include titania, ARCTIC™ IR reflective pigments (Shepherd Color Co, Cincinnati, Ohio), IR reflective ceramic pigments, IR reflective mixed metal oxide pigments, IR reflective complex inorganic colored pigments, ARCTIC™ Black 10C909, and Black 411.

Substrates and Uses

As indicated above, a feature, e.g., reflective security feature or reflective decorative feature, of the present invention preferably is disposed on a substrate surface of a substrate. The substrate preferably has a substrate surface that is flat or substantially planar. The substrate may or may not be porous. Possible substrates for use with the features of the present invention include substrates having a low softening or melting point such as paper, polymers, etc. In a preferred embodiment of the invention, the substrate surface onto which the security elements or features can be printed, deposited, or otherwise placed has a softening and/or decomposition temperature of not higher than about 300° C., e.g., not higher than about 250° C., not higher than about 225° C., not higher than about 200° C., not higher than about 185° C., not higher than about 150° C., or not higher than about 125° C.

Non-limiting examples of substrates having substrate surfaces of which are particularly advantageous for printing, depositing, or otherwise placing security elements or features on include one or more of the following: a fluorinated polymer, polyimide, epoxy resin (including glass-filled epoxy resin), polycarbonate, polyester, polyethylene, polypropylene, bi-oriented polypropylene, mono-oriented polypropylene, polyvinyl chloride, ABS copolymer, wood, paper, metallic foil, glass, banknotes, linen, labels (e.g., self adhesive labels, etc.), synthetic paper, flexible fiberboard, non-woven polymeric fabric, cloth and other textiles. Other particularly advantageous substrates and substrate surfaces include cellulose-based materials such as wood, paper, cardboard, or rayon, and metallic foil and glass (e.g., thin glass). Although the security elements and features of the present invention are particularly useful for temperature-sensitive materials, it is to be appreciated that other substrates such as, e.g., metallic and ceramic substrates, may be useful as well.

As indicated above, the porosity of the substrate may play a role in determining whether the feature exhibits color constancy or color shifting. As indicated above, the substrate, in one embodiment, is substantially porous, meaning that the substrate is sufficiently porous to allow wicking of at least 50 weight percent, preferably at least 70 weight percent, and more preferably at least 80 weight percent, of the colorant in the reflective feature. Such substrates may be desirable to form reflective features that exhibit color constancy. Alternatively, the substrate is substantially non-porous, meaning at least 50 weight percent, preferably at least 70 weight percent, more preferably at least 80 weight percent, and most preferably at least 90 weight percent of the colorant in the reflective feature remains disposed on top of the substrate rather than within the pores of the substrate (e.g., through wicking of the ink during formation of the reflective feature). Such substrates may be desirable to form color shifting reflective features. In one embodiment, the substrate comprises a supporting substrate and a coating disposed thereon, wherein the coating provides a substantially non-porous surface, as defined above. In another embodiment, the substrate has in image disposed thereon.

Possible uses for the features of the present invention may vary widely. Generally, the features of the invention may be employed in any product that is subject to counterfeiting, imitation or copying. Thus, in one embodiment, the invention is to a banknote comprising the feature of the present invention. In another embodiment, the invention is to a fiduciary document comprising the feature of the invention. In another embodiment, the invention is to a certificate of authenticity comprising the feature of the invention. In another embodiment, the invention is to a brand authentication tag comprising the feature of the present invention. In another embodiment, the invention is to an article of manufacture comprising a brand authentication tag comprising the feature of the present invention. In another embodiment, the invention is to a tax stamp comprising the feature of the present invention. In another embodiment, the invention is to an alcohol bottle comprising a tax stamp comprising the feature of the present invention. In another embodiment, the invention is to a tobacco product container comprising a tax stamp comprising the feature of the present invention.

The reflective features of the present invention are not limited to security applications. The features may also be employed, for example, for brand protection, brand personalization (e.g., short run personal care/cosmetics), trademarks, or in graphics, decorative features, non-secure documents (e.g., business cards, greeting cards, paper products, etc.), advertisements, mass mailings, wall paper, ceramic tiles, to name but a few. Thus, in one embodiment, the reflective feature comprises a decorative or graphic reflective feature, meaning a feature that is not provided for authentication purposes, but rather primarily for a decorative purpose. The present invention is not limited to the foregoing examples, and a number of other substrates and/or substrate surfaces may comprise the features of the present invention.

Inks

The ink or inks used to form the features of the present invention may comprise a variety of different components. According to the present invention, the ink comprises nanoparticles, as fully described above, a colorant preferably capable of modifying a spectrum of light that is reflected by a reflective layer formed by the nanoparticles, and a vehicle, preferably capable of dispersing the nanoparticles. Optionally, the ink may also include one or more additives. In a preferred embodiment, the invention is to an ink, preferably suitable for direct write printing, e.g., ink jet printing (piezo-electric, thermal, drop-on-demand or continuous ink jet printing), the ink comprising nanoparticles, a colorant preferably capable of modifying a spectrum of light that is reflected by a reflective layer formed from the nanoparticles, and a vehicle.

The nanoparticles that may be included in the ink are fully described above with reference to the features, e.g., reflective security features or reflective decorative features, of the present invention. It should be noted, however, that while in ink form, the nanoparticles preferably are in a dispersed state (e.g., as an emulsion) and typically will not possess the reflective properties exhibited by the nanoparticles after they have been formed into a reflective layer in a feature of the present invention.

While in the inks, the nanoparticles preferably include an anti-agglomeration substance that inhibits agglomeration of the nanoparticles when dispersed in the ink (which may or may not be removed during formation of the features of the invention). By way of non-limiting example, particularly preferred polymers for use as an anti-agglomeration substance in the present invention include polymers which comprise monomer units of one or more unsubstituted or substituted N-vinyllactams, preferably those having from about 4 to about 8 ring members such as, e.g., N-vinylcaprolactam, N-vinyl-2-piperidone and N-vinylpyrrolidone. These polymers include homo- and copolymers, and combinations thereof. Other non-limiting examples of polymers which are suitable for use as anti-agglomeration substance in the present invention are disclosed in, e.g., U.S. Patent Application Publication 2004/0182533 A1, which published Sep. 23, 2004, the entire disclosure of which is expressly incorporated by reference herein.

According to a preferred aspect of the present invention, the nanoparticles useful in the inks and features of the present invention exhibit a small average particle size, preferably with a narrow particle size distribution. A narrow particle size distribution may be used in direct-write applications or digital printing because it may limit clogging of the orifice of a direct-write device, e.g., an ink jet head or cartridge, by large particles. Narrow particle size distributions also may provide the ability to form features having a high resolution and/or high packing density.

In one embodiment, at least about 70 wt. %, at least about 80 wt. %, at least about 85 wt. %, at least about 90 wt. %, at least about 95 wt. %, or at least about 99 wt. % of the nanoparticles useful in the inks (as well as the inventive features formed therefrom), preferably the digital inks used to form the features, are substantially spherical in shape. In another embodiment, the nanoparticles, are in the range of from about 70 wt. % to about 100 wt. % substantially spherical in shape, e.g., from about 80 wt. % to about 100 wt. % substantially spherical in shape or from about 90 wt. % to about 100 wt. % substantially spherical in shape. In another embodiment, the features and/or the inks used to form the features are substantially free of particles in the form of flakes and/or platelets.

Although highly dependant on material and the specific printing processing being implemented, in various embodiments, the reflective nanoparticle loading in the ink, e.g., piezo-electric, thermal, drop-on-demand or continuous ink jet ink or digital ink, is at least about 2% by weight, e.g., at least about 5% by weight, at least about 10% by weight, at least about 15% by weight, at least about 20% by weight, or at least about 50% by weight, based on the total weight of the total ink composition. It is preferred for the total loading of nanoparticles useful in the ink used to form the features of the present invention to be not higher than about 75% by weight, e.g., not higher than about 40% by weight, not higher than about 20% by weight, not higher than about 10% by weight, or not higher than about 5% by weight, based on the total weight of the ink composition. In various embodiments, in terms of ranges, the ink comprises from about 1 wt % to about 60 wt. % nanoparticles, e.g., from about 2 to about 40 wt. % nanoparticles, from about 5 to about 25 wt. % nanoparticles, or from about 10 to about 20 wt. % nanoparticles, based on the total weight of the ink composition. In various other embodiments, the ink comprises from about 40 wt % to about 75 wt. % nanoparticles, e.g., from about 40 to about 60 wt. % nanoparticles, based on the total weight of the ink composition. Loadings in excess of the preferred loadings can lead to undesirably high viscosities and/or undesirable flow characteristics. Of course, the maximum loading that still affords useful results also depends on the density of the nanoparticles. In other words, for example, the higher the density of the nanoparticles (e.g., of any metallic composition contained therein), the higher will be the acceptable and desirable loading in weight percent.

For thermal ink jet printing applications, the ink optionally comprises less than about 50 wt. % nanoparticles, e.g., less than about 25 wt. %, less than 20 wt. %, or less than about 15 wt. % nanoparticles. In terms of ranges, inks suitable for thermal ink jet printing applications optionally comprise from about 1 to about 50 wt. % nanoparticles, e.g., from about 2 to about 40 wt. % nanoparticles, from about 5 to about 25 wt. % nanoparticles, or from about 10 to about 20 wt. % nanoparticles, based on the total weight of the ink composition.

The ink also comprises one or more colorants, e.g., a dye or pigment, which may be selected from any of the colorants described above with reference to the features, e.g., reflective security features or reflective decorative features, of the present invention. Care should be taken that the colorant does not interact adversely with the nanoparticles also contained in the ink. For example, it is contemplated that some colorants may electrostatically interact with the nanoparticles causing agglomeration. Also, some colorants may interact with the optional agglomeration agent on the nanoparticles thereby adversely impacting the dispersability (and shelf life) of the nanoparticles in the ink.

The colorant loading in the ink will depend largely on the physical characteristics of the colorant selected. By "colorant loading" it is meant the concentration of the colorant in the ink. The colorant loading in the ink optionally is at least about 1% by weight, e.g., at least about 10% by weight, at least about 25% by weight, at least about 50% by weight, at least about 75% by weight, or at least about 90% by weight, based on the total weight of the total ink composition. Optionally, the total loading of colorant in the ink used to form the features of the present invention is not higher than about 95% by weight, e.g., not higher than about 75% by weight, not higher than about 50% by weight, not higher than about 25% by weight, or not higher than about 10% by weight, based on the total weight of the ink composition. In various embodiments, in terms of ranges, the ink comprises from about 5 wt. % to about 95 wt. % colorant, e.g., from about 5 to about 35 wt. % colorant, from about 35 to about 65 wt. % colorant, or from about 35 to about 95 wt. % colorant, based on the total weight of the ink composition. In general, higher colorant loadings, e.g., greater than about 5 wt. %, greater than about 10 wt. %, or greater than 15 wt. % are preferred for forming color shifting reflective features. Lower loadings, e.g., less than about 5 wt. %, less than about 4 wt. %, less than about 3 wt. % less than about 2 weight percent, or less than about 1 wt. % colorant, may be preferred for forming reflective features having color constancy.

The ink also comprises a vehicle for imparting desired flow characteristics to the ink. The vehicle for use in the ink, e.g., piezo-electric, thermal, drop-on-demand or continuous ink jet ink or digital ink, is preferably a liquid that is capable of stably dispersing the nanoparticles optionally comprising an anti-agglomeration substance. For example, vehicles are preferred that are capable of affording an ink dispersion that can be kept at room temperature for several days or even one, two, three weeks or months or even longer without substantial agglomeration and/or settling of the nanoparticles. To this end, it is also preferred for the vehicle to be compatible with the surface of the nanoparticles. It is particularly preferred for the vehicle to be capable of dissolving the anti-agglomeration substance, if present, to at least some extent, without removing it from the nanoparticles. In one embodiment, the vehicle comprises (or predominantly consists of) one or more polar components (solvents) such as, e.g., a protic solvent, or one or more aprotic, non-polar components, or a mixture thereof. The vehicle, in an embodiment, is a solvent selected from the group consisting of alcohols, polyols, amines, amides, esters, acids, ketones, ethers, water, saturated hydrocarbons, unsaturated hydrocarbons, and mixtures thereof.

Where the features of the invention are printed, formed or created through direct-write printing, such as ink-jet printing e.g., piezo-electric, thermal, drop-on-demand or continuous ink jet printing, or digital printing, the vehicle is preferably selected to effectively work with direct-write printing tool(s), such as, e.g., an ink-jet head, a digital head, and cartridges, particularly in terms of viscosity and surface tension of the ink composition.

In a preferred aspect, for piezo-electric ink jet inks, the vehicle comprises a mixture of at least two solvents, optionally at least two organic solvents, e.g., a mixture of at least three organic solvents, or at least four organic solvents. The use of more than one solvent is preferred because it allows, inter alia, to adjust various properties of a composition simultaneously (e.g., viscosity, surface tension, contact angle with intended substrate etc.) and to bring all of these properties as close to the optimum values as possible. In one embodiment, the vehicle comprises a mixture of ethylene glycol, ethanol and glycerol. Non-limiting examples of vehicles are disclosed in, e.g., U.S. Pat. Nos. 5,853,470; 5,679,724; 5,725,647; 4,877,451; 5,837,045 and 5,837,041, the entire disclosures of which are incorporated by reference herein.

For thermal ink jet inks, the vehicle preferably comprises a mixture of at least two solvents, optionally at least two organic solvents, e.g., a mixture of at least three organic solvents, or at least four organic solvents. The use of more than one solvent is preferred because it allows, inter alia, to adjust various properties of a composition simultaneously (e.g., viscosity, surface tension, contact angle with intended substrate etc.) and to bring all of these properties as close to the optimum values as possible. Preferably, for thermal ink jet printing applications, the vehicle comprises water, optionally with one or more other vehicles. In one embodiment, the vehicle comprises a mixture of propylene glycol and water.

In a preferred embodiment, particularly for thermal ink jet printing applications, the vehicle comprises water. For example, the vehicle optionally comprises at least 30 wt. % water, at least 40 wt. % water, at least 50 wt. % water, at least 60 wt. % water, or at least 70 wt. % water, based on the total weight of the vehicle.

It is desirable to also take into account the requirements, if any, imposed by the deposition tool (e.g., in terms of viscosity and surface tension of the ink) and the surface characteristics (e.g., acidity, hydrophilicity or hydrophobicity) of the intended substrate in selecting the vehicle of choice. Although the desired ink viscosity may depend greatly on the specific deposition tool implemented, inks used to form the features of the present invention, particularly those intended for ink-jet printing with a piezo head, preferably have a viscosity (measured at 20° C.) that is not lower than about 2 centipoise (cP), e.g., not lower than about 12 cP, or not lower than about 15 cP, and optionally not higher than about 50 cP, e.g., not higher than about 40 cP, not higher than about 30 cP, or not higher than about 25 cP. In one embodiment, the ink has a viscosity (measured at 20° C.) that is greater than about 0.5 cP, e.g., greater than about 1.0 cP, or greater than about 1.3 cP, and less than about 10 cP, e.g., less than about 7.5 cP, less than about 5 cP, or less than about 4 cP.

The vehicle preferably provides the ink with a surface tension (measured at 20° C.) ranging from about 10 to about 60 dynes/cm, e.g., from about 10 to about 50 dynes/cm or from about 10 to about 40 dynes/cm.

The ink, e.g., piezo-electric, thermal, drop-on-demand or continuous ink jet ink or digital ink, in an embodiment can further comprise one or more additives, such as, but not limited to, adhesion promoters, rheology modifiers, surfactants, wetting angle modifiers, humectants, crystallization inhibitors, binders, and the like. The ink optionally further comprises a protective coating material such as a lacquer, polymer or a varnish. Such additives are fully described in co-pending U.S. patent application Ser. No. 11/331,233, previously incorporated herein by reference.

Processes for Forming Reflective Features

In another aspect, the invention relates to processes for forming a feature, e.g., a reflective security feature or a reflective decorative feature, from one or more inks. In one embodiment, the process comprises the steps of: providing an ink (e.g., the ink described above) comprising nanoparticles (e.g., any of the nanoparticles described above), a colorant (e.g., any of the colorants described above), and a vehicle (e.g., as described above); and depositing the ink onto a substrate under conditions effective to form the reflective feature. The nanoparticles and colorant preferably are homogenously mixed in the ink before and after deposition (as well as after treating, e.g., curing, described below) to provide a feature having uniform characteristics, as described above.

In a second process embodiment, the invention is to a process for forming a feature, e.g., reflective security feature or reflective decorative feature, from more than one ink. In this embodiment, a first ink provides the nanoparticles (preferably having an average particle size of from about 20 nm to about 100 nm) and a second ink provides the colorant. Thus, this process comprises the steps of: providing a first ink comprising nanoparticles and a first vehicle; providing a second ink comprising a colorant, preferably capable of modifying a spectrum of light that is reflected by a reflective layer formed from the nanoparticles, and a second vehicle; and depositing the first and second inks onto a substrate under conditions effective to form the feature. In this embodiment, the first ink may be deposited before, after or simultaneously with the second ink.

Preferably, the depositing of the ink comprises the step of direct write printing (e.g., ink jet printing (piezo-electric, thermal, drop-on-demand or continuous ink jet printing), or digitally printing) the ink (or, if multiple inks are used, one or more of the first ink and/or the second ink) onto the substrate surface. In the multiple ink embodiment, the depositing optionally comprises direct write printing (e.g., piezo-electric, thermal, drop-on-demand or continuous ink jet printing) at least one of the first ink and/or the second ink.

After deposition of the one or more inks, the deposited inks preferably are treated to form a reflective feature. The treating optionally comprises simply allowing the deposited ink to dry. In this embodiment, the vehicle in the deposited ink is allowed to vaporize (with or without application of one or more of heat, pressure, IR radiation and/or UV radiation) into the atmosphere to form the feature, e.g., reflective security feature or reflective decorative feature. After drying, the nanoparticles yielded from the ink during drying have a relatively high degree of reflectivity, meaning the nanoparticle film or layer formed from the ink or inks possesses a high degree of optical smoothness (e.g., having a surface roughness less than about 250 nm). With subsequent additional treating steps, e.g., heating, rolling, pressing, UV curing, IR curing, etc., the reflectivity increases, meaning that the optical smoothness of the nanoparticle film or layer is increased relative to the reflectivity in the case of just allowing the deposited ink to dry without an additional treating step. Surface roughness of the feature after curing by one or more of heating, rolling, pressing, UV curing, or IR curing, may be on the order of 50 nm or less. Thus, depending on how the deposited ink or inks are treated, the feature optionally comprises a reflective layer comprising the metallic nanoparticles and optionally the colorant, the reflective layer having a root mean square surface roughness that is less than about 250 nm, less than about 100 nm, less than about 50 nm, or less than about 30 nm.

Thus, after deposition onto the substrate, the deposited ink or inks may be treated, e.g., cured, to form a feature, e.g., reflective security feature or reflective decorative feature, according to the present invention. The treating, e.g., curing, may comprise heating the deposited ink or inks to form the feature, e.g., reflective security feature or reflective decorative feature. Additionally or alternatively, the treating, e.g., curing, comprises applying UV radiation to the one or more deposited inks to form the feature, e.g., reflective security feature or reflective decorative feature. Additionally or alternatively, the treating, e.g., curing, comprises applying IR radiation to the one or more deposited inks to form the feature, e.g., reflective security feature or reflective decorative feature. Additionally or alternatively, the treating, e.g., curing, comprises applying pressure (e.g., by using a roller or press), optionally with heat, to the one or more deposited inks to form the feature, e.g., reflective security feature or reflective decorative feature.

In the multiple ink embodiment, the deposited inks may be treated, e.g., cured, in a single treating step (after deposition of both the first and second inks), or individual treating steps (e.g., the first ink is deposited and treated before deposition and treating of the second ink, or the second ink is deposited and treated before deposition and treating of the first ink) to form a feature of the present invention. Thus, the depositing in the multiple ink embodiment optionally comprises depositing the first ink on the substrate and depositing the second ink on the first ink, optionally after curing the first ink. In another embodiment, the depositing comprises depositing the second ink on the substrate and depositing the first ink on the second ink, optionally after curing the second ink. That is, at least one of the first ink and/or the second ink optionally is heated or cured with UV radiation to form the feature, e.g., reflective security feature or reflective decorative feature of the present invention.

After deposition of the first and second inks, the first and second inks may be allowed to bleed into one another. That is, the nanoparticles and colorant may be allowed to become homogenously mixed after deposition (as well as after treating, e.g., curing) to provide a feature having uniform characteristics, as described above.

Alternatively, if the first ink is deposited and treated, e.g., cured, before deposition and treating of the second ink, a multi-layered feature may be formed comprising a first layer, e.g., reflective layer, comprising the nanoparticles disposed on the substrate and a second layer comprising the colorant (and optionally further comprising a protective coating material such as a lacquer, polymer or a varnish) disposed on top of the first layer, e.g., reflective layer. In another embodiment, the second ink is deposited and treated, e.g., cured, before deposition and treating of the first ink, and a multi-layered feature is formed comprising a second layer comprising the colorant disposed on the substrate and a first layer, e.g., reflective layer, comprising the nanoparticles (and optionally further comprising a protective coating material such as a lacquer, polymer or a varnish) disposed on top of the second layer.

In a preferred embodiment, the substrate comprises a supporting material and a coating on the supporting material. The coating optionally comprises a lacquer, varnish or polymer. In this embodiment, the ink or inks (optionally at least one of the first ink and/or the second ink in the multiple ink embodiment) preferably are deposited on the coating, and the coating inhibits bleeding of the colorant into the substrate. This embodiment may be particularly desirable to create a feature having color shifting, described above, as the coating layer retains the colorant on the surface of the substrate.

In another embodiment, the invention is to a reflective security feature or reflective decorative feature formed by any of the processes described herein.

The present invention will be better understood in view of the following non-limiting examples.

EXAMPLE 1

Silver Nanoparticles+Rhodamine on Non-Porous Substrate

A reflective feature was formed by ink jet printing an ink comprising silver nanoparticles (average particle size=20-80 nm) and rhodamine dye onto a non-porous substrate. The ink had the formulation shown in Table 3, below.

TABLE 3

SILVER NANOPARTICLE/RHODAMINE
INK JET INK FORMULATION

| Ingredient | Weight Percent |
|---|---|
| Rhodamine | 4.3 |
| Silver Nanoparticles | 9.5 |
| Glycerol | 16.4 |
| Ethanol | 44.0 |
| Ethylene Glycol | 25.8 |

The substrate comprised glossy Epson photopaper, which was made substantially non-porous by forming a non-porous lacquer coating on the surface of the paper. The coating was formed by applying RJE A8070 Lacquer Medium cvec 12414 (Cavalier Inks and Coatings, Richmond, Va.) onto the Epson photopaper and allowing it to dry.

The ink was then ink jet printed onto the lacquer-coated paper utilizing a Hewlett-Packard thermal ink jet printing head (Model HP45A cartridge) and allowed to dry. The printing pattern comprised a repeating pattern of microprinted numbers (2 Pt. font size). Visibly, the reflective feature exhibited a color shift between a dark magenta metallic color and a green metallic color as the viewing angle changed.

Figure 7:
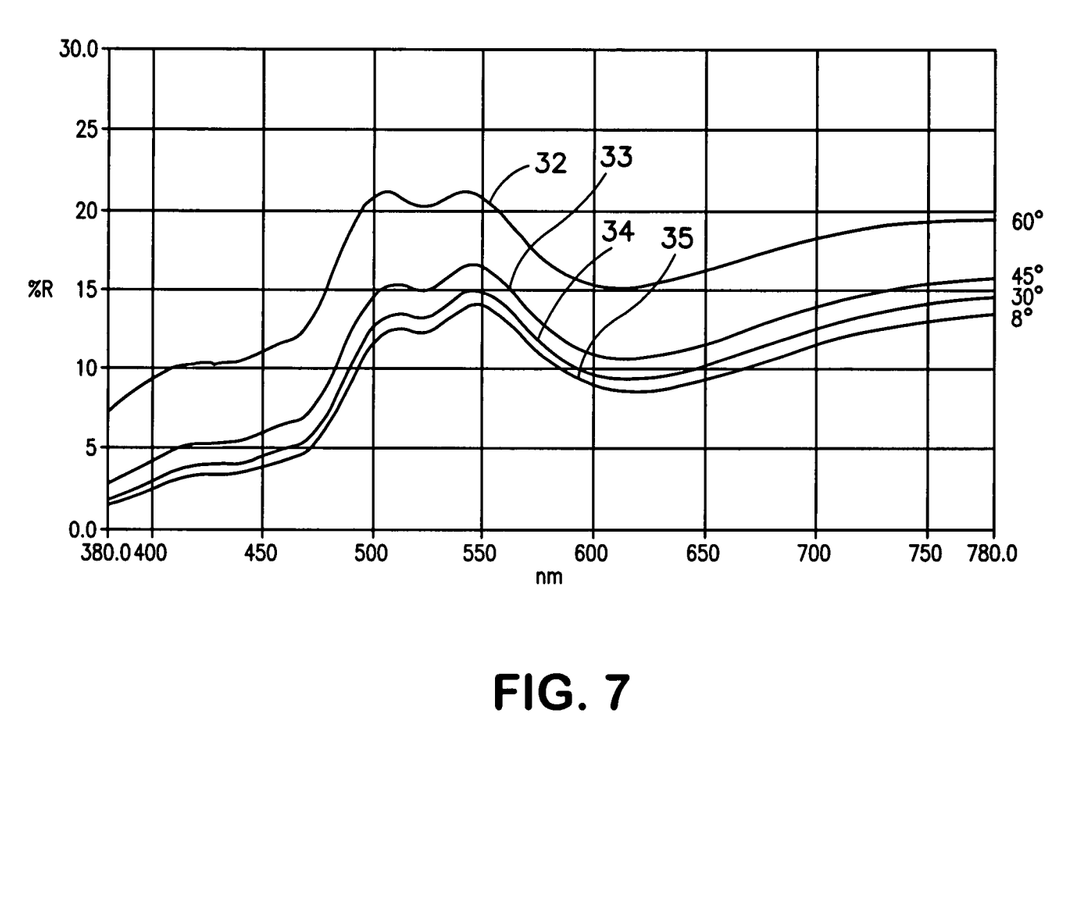
FIG. 7 presents a chart showing various spectra at different angles for a reflective feature exhibiting color shifting according to one embodiment of the present invention.

FIG. 7 presents a graph (from a Perkin-Elmer UV/vis spectrophotometer model λ-850 with a universal reflectance accessory) plotting Reflectance (R) versus wavelength for 4 angles: 8° (curve 35), 30° (curve 34), 45° (curve 33) and 60° (curve 32)) of specular reflectance (where the angle of incidence equals angle of reflection) for the feature formed in Example 1. As can be seen, the intensity of reflection and the peak (wavelength) of reflection varies with each angle. Accordingly, this graph shows that the color (wavelength) and amount of reflection varies with angle of viewing. That is, the experimental graph confirmed what was observed visually; the reflective feature exhibited color shifting.

EXAMPLE 2

Silver Nanoparticles+Rhodamine on Porous Substrate

The ink employed in Example 1 was ink jet printed onto a substantially porous substrate, (uncoated) glossy Epson photopaper, utilizing a Hewlett-Packard thermal ink jet printing head (Model HP45A cartridge) and allowed to dry. The printing pattern comprised a repeating pattern of microprinted numbers (2 Pt. font size). Visibly, the reflective feature exhibited a dark magenta metallic color that did not change as the viewing angle changed. Unlike the feature formed in Example 1, the reflective feature formed in Example 2 exhibited color constancy. Microscopically, the feature exhibited a halo effect, as shown in FIG. 5.

EXAMPLE 3

Silver Nanoparticles+Basic Fuchsin on Non-Porous Substrate

A reflective feature was formed by ink jet printing an ink comprising silver nanoparticles (average particle size=20-80 nm) and basic fuchsin dye onto a non-porous substrate. The ink had the formulation shown in Table 4, below.

TABLE 4

SILVER NANOPARTICLE/BASIC FUCHSIN
INK JET INK FORMULATION

| Ingredient | Weight Percent |
|---|---|
| Basic Fuchsin | 4.3 |
| Silver Nanoparticles | 9.5 |
| Glycerol | 16.4 |
| Ethanol | 44.0 |
| Ethylene Glycol | 25.8 |

The substrate comprised glossy Epson photopaper, which was made substantially non-porous by forming a non-porous lacquer coating on the surface of the paper. The coating was formed by applying RJE A8070 Lacquer Medium cvec 12414 (Cavalier Inks and Coatings, Richmond, Va.) onto the Epson photopaper and allowing it to dry.

The ink was ink jet printed onto the lacquer-coated paper utilizing a Hewlett-Packard thermal ink jet printing head (Model HP45A cartridge) and allowed to dry. The printing pattern comprised a repeating pattern of microprinted numbers (2 Pt. font size). Visibly, the reflective feature exhibited a color shift between a dark magenta metallic color and green metallic color as the viewing angle changed.

EXAMPLE 4

Silver Nanoparticles+Basic Fuchsin on Porous Substrate

The ink employed in Example 3 was ink jet printed onto a substantially porous substrate, uncoated glossy Epson photopaper, utilizing a Hewlett-Packard thermal ink jet printing head (Model HP45A cartridge) and allowed to dry. The printing pattern comprised a repeating pattern of microprinted numbers (2 Pt. font size). Visibly, the reflective feature exhibited a dark magenta metallic color that did not change as the viewing angle changed. Unlike the feature formed in Example 3, the reflective feature formed in Example 4 exhibited color constancy. Microscopically, the feature exhibited a halo effect, similar to the effect shown in FIG. 5.

EXAMPLE 5

Silver Nanoparticles+Rhodamine in Separate Layers

A reflective feature was formed by ink jet printing an ink comprising silver nanoparticles (average particle size=20-80 nm) and treating the first layer (reflective layer) to form a first coating, and then forming a second layer comprising a colored lacquer on top of the first layer (reflective layer). The substrate comprised (uncoated) glossy Epson photopaper.

The ink had the formulation shown in Table 5, below.

TABLE 5

SILVER NANOPARTICLE
INK JET INK FORMULATION

| Ingredient | Weight Percent |
|---|---|
| Silver Nanoparticles | 10.0 |
| Glycerol | 17.0 |
| Ethanol | 46.0 |
| Ethylene Glycol | 27.0 |

The ink was deposited on the substrate utilizing a Hewlett-Packard thermal ink jet printing head (Model HP45A cartridge) and allowed to dry. The printing pattern comprised a repeating pattern of microprinted numbers (2 Pt. font size). After drying, the a colored lacquer coating was deposited with a draw bar on the surface of the paper and allowed to dry. The colored coating was formed by adding rhodamine dye to RJE A8070 Lacquer Medium cvec 12414 (Cavalier Inks and Coatings, Richmond, Va.) to obtain a 5 wt % rhodamine concentration, based on the total weight of the colored lacquer coating. The reflective feature formed in Example 5 thus had two layers, a first silver nanoparticle layer, and a colored lacquer layer disposed thereon. The feature appeared to have a dark magenta metallic color and exhibited color constancy. The feature did not exhibit a halo effect since the colorant was contained in a different layer than the nanoparticles. No color shifting was observed While the present invention has been described with reference to exemplary embodiments, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials, and embodiments, the invention is not intended to be limited to the particulars disclosed herein. Instead, the invention extends to all functionally equivalent structures, methods, and uses, such as are within the scope of the appended claims.

We claim:

1. A color shifting feature comprising nanoparticles of one of an elemental metal and a metal alloy, the nanoparticles further including nanoparticles of a metal oxide, wherein the color shifting feature comprises a first layer on a substrate surface, the first layer comprising the nanoparticles, and a second layer disposed on the first layer, the second layer comprising interference particles.

2. The feature of claim 1, wherein each interference particle comprises a first metal oxide core having opposing major planar surfaces, and a second metal oxide disposed on the opposing major planar surfaces.

3. The feature of claim 2, wherein the first metal oxide is selected from the group consisting of: silica, titania and mica, and wherein the second metal oxide is different from the first metal oxide but also is selected from the group consisting of: silica, titania and mica.

4. The feature of claim 1, wherein the nanoparticles have an average particle size of from about 10 nm to about 1,000 nm.

5. The feature of claim 1, wherein the feature is disposed on a substantially non-porous substrate surface.

6. The feature of claim 1, wherein the feature comprises a security feature.

7. The feature of claim 1, wherein the feature comprises a decorative feature.

8. The feature of claim 1, wherein the color shifting is observable as a position of a light source is moved.

9. The feature of claim 1, wherein the color shifting is observable as the feature is moved.

10. The feature of claim 1, wherein the color shifting is observable as an observer's position is moved.

11. The feature of claim 1, further comprising a colorant capable of modifying at least a portion of a spectrum of radiation that is reflected by the nanoparticles.

12. The feature of claim 1, wherein the interference particles comprise a metal oxide.

13. The feature of claim 1, wherein the interference particles comprise a composition selected from the group consisting of silica, titania, and mica.

* * * * *